Feb. 19, 1935.  J. C. McCUNE  1,991,905
SAFETY CAR CONTROL DEVICE
Filed June 27, 1933  3 Sheets-Sheet 3
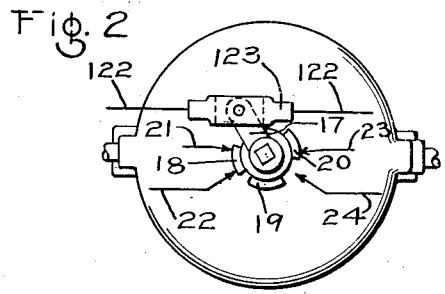
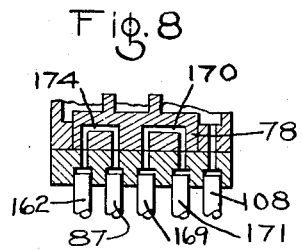
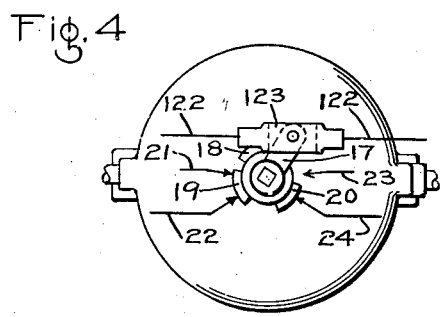
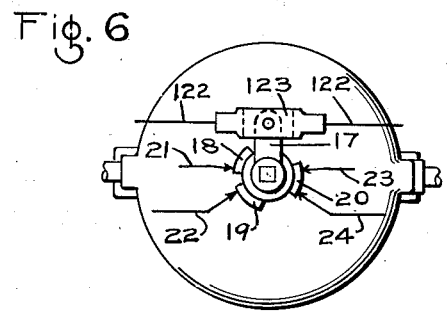
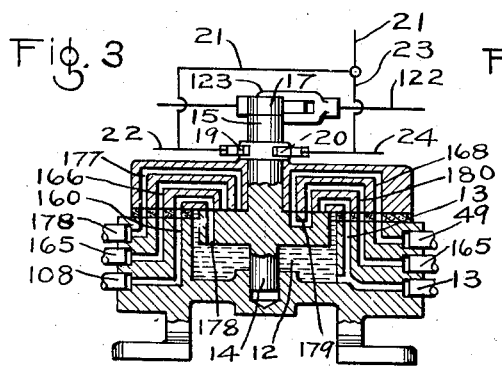
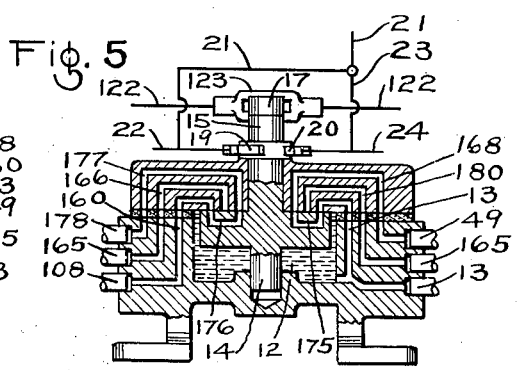
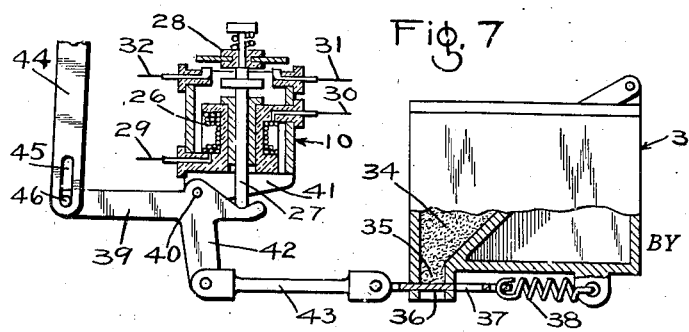
INVENTOR
JOSEPH C. McCUNE
Wm. H. Cady
ATTORNEY Patented Feb. 19, 1935

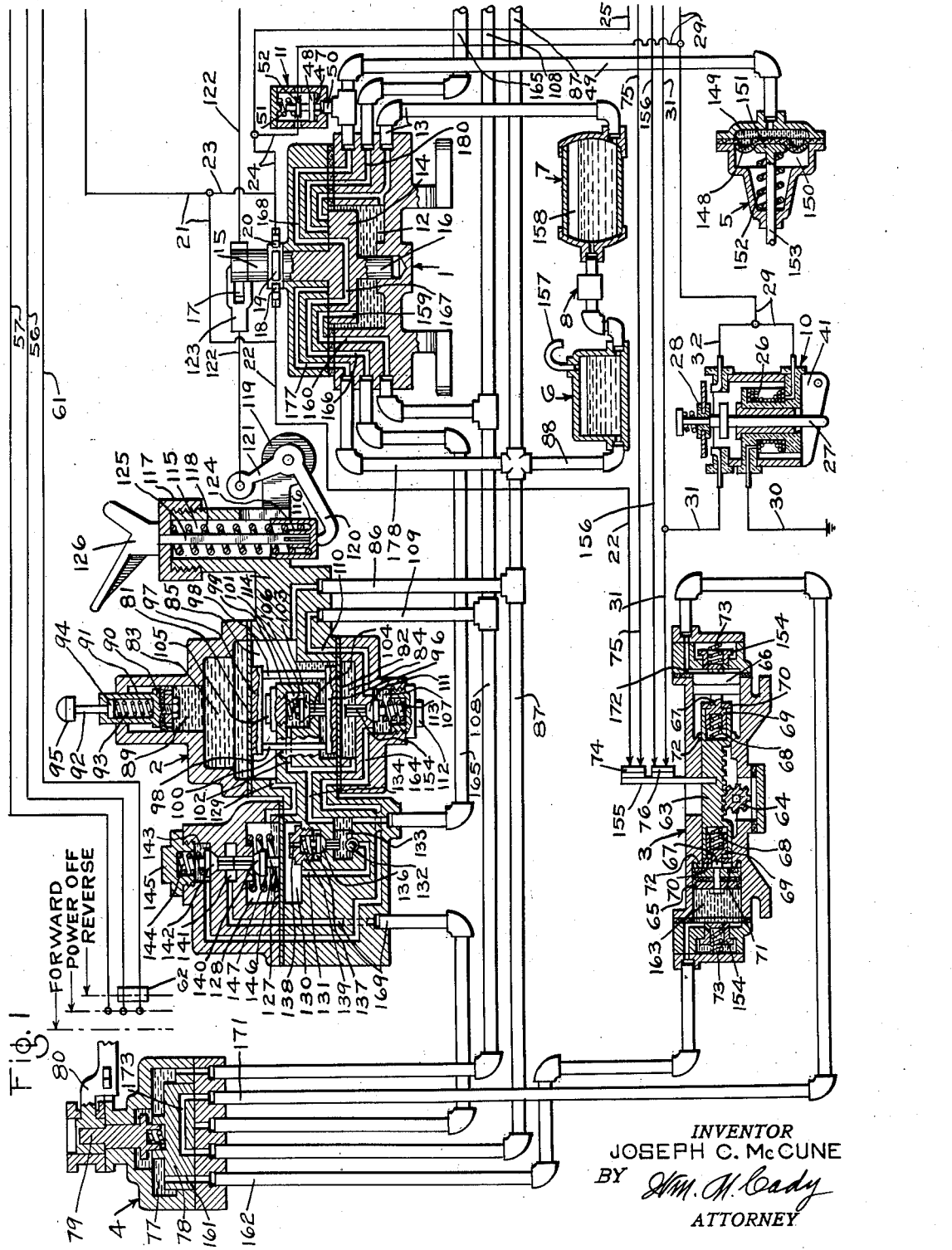

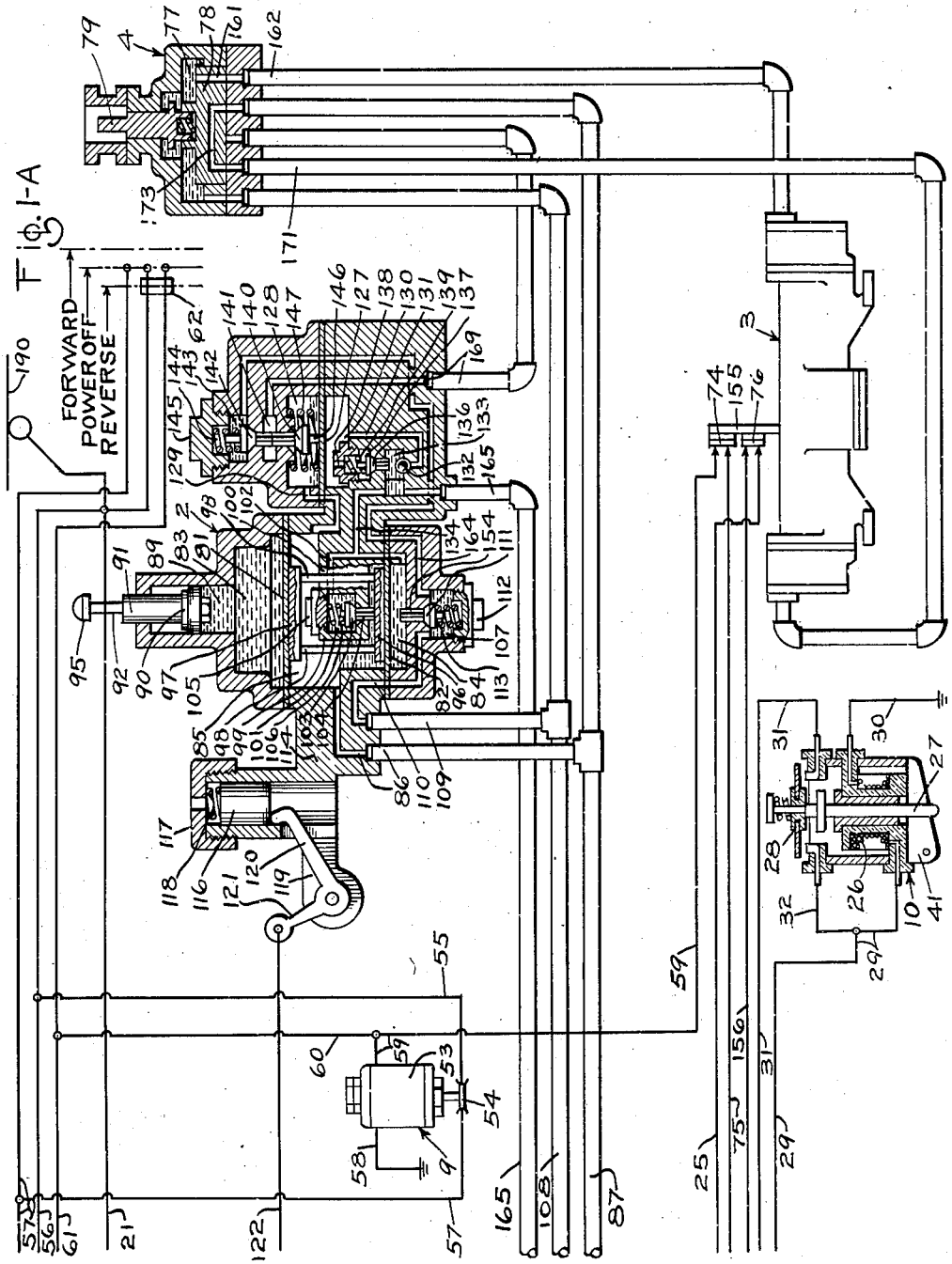

1,991,905

UNITED STATES PATENT OFFICE 1,991,905

SAFETY CAR CONTROL DEVICE

Joseph C. McCune, Edgewood, Pa., assignor to The Westinghouse Air Brake Company, Wilmerding, Pa., a corporation of Pennsylvania Application June 27, 1933, Serial No. 677,794

8 Claims. (Cl. 303—6.1)

This invention relates to fluid pressure brakes and more particularly to a hydraulic brake system adapted for use on traction cars.

In my co-pending application for United States Letters Patent, Serial No. 653,383, filed January 25, 1933, an improved hydraulic brake and door control equipment is disclosed having a manually controlled brake valve device for applying and releasing the brakes and an emergency valve device which is moved to and maintained in normal position, by manual pressure exerted by the operator, for permitting the brake to be controlled by said brake valve device, said emergency valve device being operative, upon relief of manual pressure by the operator, to effect an emergency application of the brakes. The emergency valve device is operative, in normal position, to effect closure of the power circuit to the car motors and is operative, in emergency position, to open said circuit.

One object of this invention is to provide improved means whereby, when an emergency application of the brakes is effected through the operation of the above mentioned emergency valve device, the power supply to the car motors will be cut off and sand will be automatically applied to the rails until a car door is opened, but sand will not be applied upon closing said door.

Another object of this invention is to provide means whereby the power circuit may be closed independently of the emergency valve device so that, in case the hydraulic brake should fail to apply, for any reason, the car motors may be reversed for the purpose of stopping the car.

Other objects and advantages will appear in the following more detailed description of the invention.

In the accompanying drawings; Figs. 1 and 1—A, when associated, form a diagrammatic view, mainly in section, of a double end hydraulic brake and door control equipment similar to that disclosed in my aforementioned pending application and having my invention applied thereto, the emergency valve device being shown in its normal operating positions when operating the car from the left hand end; Fig. 2 is a plan view of the emergency valve device, with the operating parts shown in a position corresponding to the position of the parts of the device shown in Fig. 1; Fig. 3 is a diagrammatic sectional view of the emergency valve device with the parts shown in their normal operating position when operating the car from the right hand end; Fig. 4 is a plan view of the emergency valve device with the operating parts shown in a position corresponding to the position of the parts of the device shown in Fig. 3; Fig. 5 is a diagrammatic sectional view of the emergency valve device with the parts shown in emergency position; Fig. 6 is a plan view of the emergency valve device with the operating parts shown in emergency position; Fig. 7 is an elevational view, partly in section, of the sand trap, the magnet for automatic control and the lever for manual control of the operation of said sand trap; Fig. 8 is a diagrammatic sectional view of a portion of the hand operated control valve device showing the communications established in the door opening position.

As shown in Figs. 1 and 1—A of the drawings, the brake equipment may comprise an emergency valve device 1 located intermediate the ends of the car, and a foot controlled brake valve device 2 at each end of the car for controlling the car brakes and for conditioning the emergency valve device 1 according to which end of the car is the operating or controlling end. The brake equipment further comprises at each end of the car a door engine 3, a hand operated door valve device 4 controlled by the operator for controlling the door engine 3 at the operating end of the car, a brake cylinder 5, a sump reservoir 6 containing liquid under atmospheric pressure, a pressure reservoir 7 containing liquid under operating pressure, and a reversible pump 8 for pumping liquid from the sump reservoir 6 into the reservoir 7. The equipment also comprises a circuit breaker device 9, a sanding magnet device 10 at each end of the car for controlling the opening and closing of the outlet of the sand trap 33, and a switch device 11.

The emergency valve device 1 comprises a casing having a chamber 12 in constant communication with the pressure reservoir 7 through passage and pipe 13 and containing a rotary valve 14. The rotary valve 14 is provided axially on the seating side with an operating shaft 15 journaled in a suitable bore through the casing and extending exteriorly of the casing, and is provided axially on the opposite side with a guide member 16 rotatably mounted in a suitable socket in the casing. Secured to the outer end of the operating shaft 15 is an operating lever 17 for turning the rotary valve from the emergency position shown in Fig. 5 to either the position shown in Fig. 1 or the position shown in Fig. 3, according to which end of the car is the operating or controlling end.

The rotary valve operating shaft 15 is provided with three electric contact members 18, 19 and 20 which are suitably insulated from said shaft and from one another. The contact member 18 is adapted, when the lever 17 is in the position shown in Fig. 2, to connect a contact connected by a supply wire 21, which leads to the trolley wire 190, to a wire 22 leading to a contact controlled by a switch device operated by the door engine 3 at the left hand end of the car, as will be understood from the description hereinafter. The contact member 19 is adapted, when the lever 17 is in the position shown in Fig. 4, to establish the same connections as are established by the contact 18 when said lever is in the position shown in Fig. 2, as just described. The contact member 20 is adapted, when the lever 17 is in the emergency position shown in Fig. 6, to connect a contact, which is connected by a wire 23 to the supply wire 21, to another contact which is connected by a wire 24 to a contact controlled by the switch device 11, and which is also connected by the wire 24 to a wire 25 leading to a contact controlled by a switch device operated by the door engine 3 at the right hand end of the car. In the emergency position, the contact member 18 engages the contact member connected to the wire 21 while the fixed contact 19 engages the contact member connected to the wire 22, which contacts 18 and 19 are insulated from each other.

The sand trap 33 may comprise, for the purpose of illustration, a casing having a chamber 34 adapted to contain sand and having an outlet passageway 35 through which sand may be discharged onto the rails. A door 36 slidably mounted in the casing controls communication through said outlet passageway, said door being provided with an aperture 37 which is adapted to open communication through said passageway, a spring 38 being provided to normally hold the door in a position in which said passageway is closed. Electrical means automatically operated, as well as manually operated means, are provided for pulling the door 36 to the open position against the opposing force of the spring 38.

The electrical means for automatically controlling the operation of the door 36 of the sand trap 33 comprises a sanding magnet device 10. Said sanding magnet device comprises an operating coil 26 and a plunger 27 having mounted thereon a switch member 28. One terminal of the operating coil is connected to a wire 29 which leads to the switch device 11, while the other terminal of said magnet is permanently connected by a wire 30 to the ground. The switch member 28 is adapted to connect a contact, which is connected by a wire 31 to a contact controlled by a switch device operated by the door engine 3 at the left hand end of the car, to another contact which is connected by a wire 32 to the wire 29.

The end of the plunger 27 may engage the right hand end of an arm 39 of a bell-crank member which may be pivotally mounted, by means of a pin 40, on a bracket 41 provided on the sanding magnet device 10, the other arm 42 being operatively connected, by means of the rod 43, to the door 36 of the sand trap 33.

For manually controlling the operation of the door 36 of the sand trap 33, a rod 44 may be provided which is provided with a slotted opening 45 in which is received a pin 46 which may be carried by the left hand end of the arm 39, said rod being adapted, when a pull is applied to the upper end thereof, to rotate the bell-crank in a clockwise direction and thereby shift the rod 43, and consequently the door 36, leftwardly, so that the aperture 37 will open communication through the passageway 35 for permitting sand to be discharged from the chamber 34 onto the rails.

For interlocking the control of the sanding magnet device 10 with the build-up of brake cylinder pressure, a switch device 11 is provided. Said switch device may comprise a cylinder having a piston chamber 47 containing a piston 48 subject on one side to the pressure in the brake cylinder pipe 49, through the pipe 50, as will be understood from the description hereinafter. The piston 48 is subject on the opposite side to the pressure of a coiled spring 51. Said piston is adapted to control the operation of a switch member 52 which is, in turn, adapted to control the circuit which includes a contact connected to the wire 24 and a contact connected to the wire 29, said piston being adapted, when the pressure in the brake cylinder increases to a predetermined value, as fixed by the pressure exerted by the spring 51, to cause said switch member to open said circuit.

The circuit breaker device 9 is provided for the purpose of controlling the power supply to the car motors and comprises an electro-magnet 53 and a switch member 54 operatively controlled by said magnet and operative upon energization thereof to close the circuit from a wire 55, which is connected by a wire 56 to the supply wire 21, to a wire 57 which leads to the conventional controllers at each end of the car for controlling the supply of current to the usual car motors (not shown), said controllers having the usual forward, power off, and reverse positions, as shown in Figs. 1 and 1—A.

One terminal of the circuit breaker magnet 53 is permanently connected by a wire 58 to the ground, while the other terminal is connected by a wire 59 to a contact controlled by a switch device operated by the door engine 3 at the right hand end of the car. Said last mentioned terminal is also connected by a wire 60, which may be connected to the wire 59, to a wire 61 which is adapted to be connected, by the controller reverser movable contact 62, to the wire 56 leading to the supply wire 21.

Both of the door engines 3 are the same in construction, each comprising a casing, a movable rack 63, a gear 64 meshed with said rack and through the medium of which a car door is opened and closed in the usual well known manner, a door closing piston 65 for moving the rack to the door closed position, as shown in Fig. 1, and a door opening piston 66 for moving the rack in the opposite direction to the door open position.

The door closing piston 65 and the door opening piston 66 are each provided with a stem 67 slidably mounted in a suitable bore in the end of the rack 63. A spring 68 is contained in a bore in the end of the stem 67 and engages the rack at the bottom of the bore in the rack for urging the stem 67 outwardly, such outward movement being limited by the engagement of a shoulder 69 on the stem 67 with an apertured cover plate 70 secured to the end of the rack 63. According to this construction, after the rack 63 has been moved to the position in which the door is open or to the position in which the door is closed, the actuating piston 65 or 66, each of which is provided with a gasket 71, may continue to move relative to the rack until the gasket 71 effects sealing engagement with a seat rib 72 so as to prevent leakage of liquid under pressure from the actuating side of the piston to the low pressure side intermediate the pistons 65 and 66.

A stop 154, acted upon by a spring 73, is slidably mounted in a suitable bore in the casing and is adapted to be engaged by the door opening piston 66 in order to resiliently arrest the movement of the door engine parts in the door closed position, while a corresponding stop 72 and a spring 73 are provided in the opposite end of the door engine to resiliently arrest the movement of the door engine parts in the door open position, as will be hereinafter more fully described.

Carried by the rack 63 is a switch device comprising an arm 155 having mounted thereon the two contacts 74 and 76 which are suitably insulated from said arm and from each other. When the door engines are in the door closed position, the contact 74, at the left hand end of the car, closes a circuit which includes the wires 22 and 75, the contact 74 associated with the switch device operated by the door engine 3 at the right hand end of the car, and the wire 59 leading to the magnet 53 of the circuit breaker 9. The contact 76, at the left hand end of the car, closes a circuit which includes the wire 31 leading to the switch portion of the sanding magnet devices 10, the wire 156, the contact 76 of the switch device operated by the door engine at the right hand end of the car, and the wire 25 which is connected to the wire 24.

The door valve 4 at each end of the car controls the operation of the door engine 3 at the corresponding end. The door valve 4 comprises a casing having a chamber 77 containing a rotary valve 78 adapted to be turned to the operating positions, shown in Figs. 1 and 8, through the medium of a shaft 79, on the outer end of which is removably mounted a manually operable handle 80, as shown on the door valve at the left hand end of the car.

The brake valve device 2 at each end of the car comprises a casing containing two flexible diaphragms 81 and 82, the diaphragm 81 being subject on one side to the pressure of liquid in a control chamber 83, the diaphragm 82 being open at the opposite side to a chamber 84 which is normally open to the brake cylinder 5, while said diaphragms cooperate to form an intermediate chamber 85 which is at all times in communication with the sump reservoir 6 through pipes 86, 87 and 88.

Opening into the control chamber 85 is a bore 89 which is of small diameter as compared with the diameter of the diaphragm 81. A plunger 90 is slidably mounted in said bore and is provided with a hollow guide member 91 extending through a suitable bore in the casing and containing a movable member 92 between which and the plunger 90 is interposed a brake control spring 93. An enlarged portion 94 on the inner end of the member 92 is provided to engage a shoulder in the guide member 91 for limiting outward movement of said member, and a button 95 is provided on the outer end of said member and is adapted to be engaged by the ball of an operator's foot for operating said member. The chamber 83 between the diaphragm 81 and the plunger 90 is adapted at all times to be completely filled with liquid.

The chamber 85 between the two diaphragms 81 and 84 contains a follower plate 96 engaging the diaphragm 82, a follower plate 97 engaging the diaphragm 81 and a plurality of struts 98 connecting the follower plates 96 and 97. The casing is provided with a lug 99 extending into chamber 85 and having a through opening 100 through which one of the struts 98 freely extends. Said lug is provided with a chamber 101 open to the brake cylinder chamber 84 through a passage 102 and contains a brake release valve 103 having a fluted stem 104 extending through a suitable bore in the lug 99 into the chamber 85. A screw-threaded nut 105 closes one end of the chamber 101 and a spring 106 is interposed between said nut and the valve 103 for urging said valve to its seat.

The casing of the brake valve device 2 is provided with a chamber 107 at all times charged with liquid under pressure from the supply pipe 108 through the connecting pipe 109 and the passage 110. A brake application valve 111 is contained in chamber 107 and has a fluted stem 154 slidably extending through a suitable bore in the casing and into the brake cylinder chamber 84. One end of chamber 107 is closed by means of a nut 112 having screw-threaded engagement with the casing, and a spring 113 is interposed between said nut and the application valve 111 for urging said valve to its seat.

A lug 114, extending rearwardly of the brake valve casing, is provided with a through bore 115 in which is slidably mounted a plunger 116. One end of the bore 115 is closed by means of a cover 117 having screw-threaded engagement with the casing, and a spring 118 is interposed between the cover 117 and the plunger 116 for urging said plunger outwardly.

A bell-crank lever is pivotally mounted on an arm 119 projecting from the lug 114, and the arm 120 of said lever engages the plunger 116. The other arm 121 of the bell-crank lever is connected, preferably by means of a flexible cable 122, to a member 123 pivotally connected to the lever 17 of the emergency valve device 1.

The plunger 116 in the brake valve device 2 is provided interiorly with a boss 124 having a recess in which is slidably mounted one end of a removable push rod 125, the other end of said push rod extending through an opening in the cover 117 and carrying on its outer end a heel plate 126 adapted to receive the heel of an operator's shoe. The push rod 125 may be square in section and the opening in the cover 117 through which said rod slidably extends may be of a corresponding shape, so as to maintain the heel plate 126 properly positioned for operating.

The brake valve device further comprises a flexible diaphragm 127 having at one side a chamber 128 communicating through a passage 129 with the sump chamber 85, and having at the opposite side a chamber 130. One way communication from chamber 130 to the brake cylinder chamber 84 is established through a passage 131, past a check valve 132 contained in a chamber 133 and from thence through the passages 134 and 102, while one way communication from the brake cylinder chamber 84 to the chamber 130 is established through the passages 102 and 134, chamber 133, past a check valve 136 contained in a chamber 137, and from thence through a passage 138. A spring 139 in the chamber 137 acts on the check valve 136 and urges said check valve toward its seat with a predetermined force.

A check valve 140 is contained in the chamber 128 for controlling communication from said chamber to a chamber 141, and an oppositely seating check valve 142 is contained in a chamber 143 for controlling communication from the chamber 143 to the chamber 141. Each of the check valves 140 and 142 is provided with a fluted stem operatively engaging each other in the chamber 141. A spring 144 is interposed between a cap nut 145, having screw-threaded engagement with the casing, and the check valve 142 for urging said check valve into engagement with its seat and at the same time for unseating the check valve 140, while the check valve 140 is provided with a stem 146 adapted to be engaged by the diaphragm 127, whereby deflection of said diaphragm in an upwardly direction will seat the check valve 140 and unseat the check valve 142. A spring 147 is contained in the chamber 128 and acts on the diaphragm 127.

The brake cylinder 5 may be of any desired type, but for the purpose of illustration may comprise a casing containing a flexible diaphragm 148 having at one side a pressure chamber 149 and at the opposite side a non-pressure or atmospheric chamber 150. A diaphragm follower 151, contained in the non-pressure chamber 150, is pressed into engagement with the diaphragm 148 by means of the usual brake release spring 152 and is provided with a push rod 153 for applying the brakes, said push rod slidably extending through a suitable opening in the casing.

In order to prepare the equipment for operation, the sump reservoir 6, which is at all times open to the atmosphere through a breather pipe, is filled with liquid, such as oil, and the pump 8 is then operated to draw the oil from said sump reservoir and force it into the pressure reservoir 7.

The pressure reservoir 7 is initially at atmospheric pressure and as liquid is forced into said reservoir, the air in said reservoir is compressed into a space, such as the space 158 above the liquid, by the liquid pumped into said reservoir, and this air under pressure in space 158 is employed, due to its great and rapid expansibility, as the medium for rapidly propelling liquid through the brake system and applying pressure to the liquid in the control of the car brakes and car doors.

The liquid under pressure in the pressure reservoir 7 flows through pipe and passage 13 to the rotary valve chamber 12 in the emergency valve device 1.

Assuming that the equipment is to be operated or controlled from the left hand end, as viewed in Fig. 1, the right hand end as viewed in Fig. 1—A being the non-operating end, the heel plate 126 on the operating end of the car is depressed by the operator's heel and this rotates the bell-crank lever arms 120 and 121 so that, by means of the cable 122, the emergency valve operating lever 17, and consequently the rotary valve 14, are turned to the position shown in Fig. 1, against the opposing pressure exerted on the lever 17 by the spring 118 at the non-operating end of the car, through the medium of the respective plunger 116, the bell-crank lever arms 120 and 121, and the cable 122. This turning movement of the emergency valve operating lever is limited by the engagement of the heel plate 126 with the cover 117, which engagement defines the normal operating position when the car is controlled from the left hand end. It will be understood that if the equipment is to be controlled from the right hand end of the car, as viewed in Fig. 1, the rotary valve 14 of the emergency valve device 1 will be positioned as shown in Fig. 3, by pressure applied to the heel plate at that end, in which position the equipment may be prepared for operation in a manner similar to that now to be described, with the equipment controlled from the left hand end.

The liquid under pressure in the pressure reservoir 7 flows through pipe and passage 13 to the rotary valve chamber 12. With the emergency valve device 1 conditioned as shown in Fig. 1, liquid under pressure supplied to the chamber 12 flows through a port 159 in the rotary valve 14 and thence through passage 160 to the pressure supply pipe 108, which extends to both ends of the car.

At both ends of the car, liquid under pressure flows from the pressure supply pipe 108 to the rotary valve chamber 77 in the door valve device 4, and from said chamber, with the door valve device 4 in the door closing position as shown in Fig. 1, liquid under pressure flows through a port 161 in the rotary valve 78 to the pipe 162 leading to the door closing piston chamber 163 in the door engine 3. Liquid under pressure also flows from the supply pipe 108 through pipe 109 to the brake valve device 2 and from thence through passage 110 to the brake application valve chamber 107, and from said chamber through a passage 164 to the chamber 143 containing the valve 142.

At the operating or control end of the car, the operator may now apply pressure to the button 95 by means of the ball of the foot which is holding the heel plate 126 in the depressed position. The button is thus operated to compress the spring 93, the pressure of which acts to move the plunger 91 downwardly so as to cause a displacement of liquid in the chambers 89 and 83, which displacement deflects the diaphragm 81 downwardly. This deflection of the diaphragm 81 acts through the follower plate 97 and the struts 98 to move the follower plate 96 away from the stem of the brake release valve 103 so as to permit the spring 106 to seat said valve. Further deflection of the diaphragm 81 and consequent movement of the follower plate 96 deflects the diaphragm 82 so as to unseat the brake application valve 111, which permits liquid under pressure to flow from the chamber 107 to the chamber 84 and from thence through passages 102 and 134, chamber 133, pipe 165, passage 166 in the emergency valve device, cavity 167 in the rotary valve 14, passage 168 and pipe 49 to the brake cylinder piston chamber 149. Liquid under pressure supplied to pipe 49 also flows through pipe 50 to the piston chamber 47 in the switch device 11.

Liquid under pressure supplied to the check valve chamber 133 in the brake valve device, as above described, acts to unseat the valve 136. When a predetermined pressure acting on the valve 136 is thus obtained, said valve is unseated against the pressure of the spring 139 and this permits liquid under pressure to flow past said valve to the chamber 137 and from thence through port 138 to the diaphragm chamber 130. The diaphragm 127 is thus deflected upwardly by the pressure of liquid supplied to the chamber 130 and acts to seat the valve 140 and unseat the valve 142.

The unseating of the valve 142 admits liquid under pressure from the chamber 143 to the chamber 141 from whence it flows through passage and pipe 169 to the seat of the rotary valve 78 in the operator's door control valve device 4. The operator turns the handle 80, and consequently the rotary valve 78 in the door valve device 4, from the door closing position, as shown in Fig. 1, to the door opening position, as shown in Fig. 8. In the door opening position, liquid under pressure supplied through pipe 169 to the seat of the rotary valve flows through cavity 170 in the rotary valve 78 to the door opening pipe 171 and from thence to the door opening piston chamber 172 in the door engine 3. After filling the chamber 172 with liquid, the door valve 4 is returned to the door closing position, as shown in Fig. 1, in which the door opening pipe 171 is opened to the sump reservoir 6 through cavity 173 in the rotary valve 78 and the pipes 87 and 88, thereby relieving the pressure on the liquid in the door opening pipe. In the door closing position of the door valve 4, the door closing pipe 162 is again opened through port 161 in the rotary valve 78 to the rotary valve chamber 77, so as to again supply liquid under pressure through said pipe to the door closing piston chamber 163 in the door engine 3.

At the right hand, or present non-operating, end of the car, as shown in Fig. 1—A, where the door valve 4 is carried in the door closing position, liquid under pressure is supplied from the rotary valve chamber 77 to the door closing end of the non-operating door engine 3 through port 161 and the door closing pipe 162. Thus, the non-operating door engine 3 is held in the door closed position, as desired.

The operator may now relieve foot pressure on the button 95 at the operating end of the car, which permits the pressure of liquid in the chamber 84 acting on the diaphragm 82 to return said diaphragm and the diaphragm 81 to their normal positions, and this permits the spring 113 to seat the brake application valve 111 so as to cut off the supply of liquid under pressure to the chamber 84. After the valve 111 is seated, the continued deflection of the diaphragms 82 and 81 causes the follower plate 96 to engage and unseat the brake release valve 103 past which the brake cylinder pressure chamber 149 is opened to the sump reservoir 6 through pipe 49, passage 168 in the emergency valve device 1, cavity 167 in the rotary valve 14, passage 166, pipe 165, and passage 134, chamber 133, passage 102, the release valve chamber 101 in the brake valve device to the sump chamber 85 and from thence to the sump reservoir 6 through pipes 86, 87 and 88, so that the pressure is relieved on the liquid in the brake cylinder piston chamber 149.

With the pressure on the liquid in the brake cylinder relieved through the pipe 49, as above described, pressure is also relieved from the piston chamber 47 of the switch device 11 through the pipe 50 which connects with the pipe 49, so that the switch member 52 closes the circuit from the wire 24 to the wire 29.

As the pressure is relieved on the liquid in the brake cylinder by connecting the brake cylinder to the sump reservoir by way of passage 134 in the brake valve device, the pressure is also relieved in the diaphragm chamber 130 which is open to passage 134 through passage 131, past the check valve 132 and through chamber 133, and this permits the spring 147 to return the diaphragm 127 to its normal position, so that the spring 144 may seat the valve 142 and cut off the supply of liquid under pressure to pipe 169 leading to the door valve device 4. The seating of the valve 142 unseats the valve 140 so that pipe 169 is opened to the chamber 128 and from thence through the passage 129 to the sump chamber 85 in the brake valve device, thereby relieving the pressure in the pipe 169.

In the manner above described, the door closing piston chamber 163 of the door engines is supplied with liquid under pressure to hold the door engines in the door closed position, while the door opening piston chamber 172 of said engines, the brake cylinder pressure chamber 149, certain chambers in the brake valve devices and the connecting control pipes are all open to the sump reservoir 6 but substantially filled with liquid under atmospheric pressure, so that in the operation of the equipment in service, as will be hereinafter described, the applying and releasing of the brakes and the opening and closing of the car doors will be effected substantially with the mere application of pressure to the liquid with which the system is substantially filled, there being very little movement of liquid through the system, and since pressure is applied to the liquid through the medium of the highly expansible air under pressure in the space 158 in the pressure reservoir 7, the small amount of liquid which will be moved in the various controlling operations and the transmission of pressure to the liquid in the various parts of the system will be very rapid.

With the brake equipment conditioned as above described, with the door engines in the door closed position, and with the heel plate 126 held in its depressed position for maintaining the emergency valve device 1 in the normal operating position shown in Fig. 1, the contact member 18 closes the circuit from the wire 21, which is connected to the trolley or power supply wire 190, to the wire 22, as shown in Fig. 2. Since the wire 22 is connected to the magnet 53 of the circuit breaker device 9, by way of the contact 74 of the switch device associated with the door engine 3 at the operating end of the car, the wire 25, the contact 74 of the switch device associated with the door engine 3 at the non-operating end of the car, and the wire 59, the circuit breaker control circuit is closed from the supply wire 21 to said magnet, which causes the energization of said magnet and this causes the switch member 54 to be operated so as to close the motive power circuit from the wire 55, which is connected to the supply wire 21 by the wire 56, to the wire 57 leading to the controller. The controller may then be operated by the operator to control the supply of current to the car motor (not shown) in the usual well known manner.

The wire 23, which is connected to the supply wire 21, is disconnected, at the emergency valve device, from the wire 24 leading to the operating coil 26 of the sanding magnet device 10, so that said coil will remain deenergized and the door 36 controlling the outlet passageway 35 of the sand chamber 34 in the sand trap 33 will remain in the closed position, as shown in Fig. 7.

If it is desired to effect an application of the brakes, the operator depresses the button 95 on the brake valve device 1 at the operating end of the car by means of the ball of the foot with which he is holding the heel plate 126 depressed. The depression of the button 95 acts through the spring 93 to move the plunger 90 inwardly, causing a displacement of the liquid in the chambers 89 and 83. This displacement of liquid moves the diaphragms 81 and 82 downwardly, permitting the spring 106 to seat the brake release valve 103 and then upon further movement the diaphragm 82 engages and unseats the brake application valve 111.

The unseating of the brake application valve 111 establishes communication from the pressure supply pipe 108 to the brake cylinder pressure chamber 149 through pipe 109, passage 110, chamber 107, past valve 111, through chamber 84, passages 102 and 134 and chamber 133, pipe 165, passage 166 in the emergency valve device, cavity 167 in the rotary valve 14, passage 168 and from thence through pipe 49, and through said communication pressure is applied to the column of liquid leading to and that contained in the brake cylinder for deflecting the brake cylinder diaphragm 148 outwardly into the non-pressure chamber 150 for applying the brakes.

When the pressure obtained in chamber 84 in the brake valve device, and consequently in the brake cylinder 5, and acting on the diaphragm 82 in said brake valve device, becomes slightly greater than the opposing pressure of the control spring 106, said diaphragm is deflected upwardly, permitting the brake application valve 111 to seat, so as to prevent further increase in pressure in chamber 84 and in the brake cylinder chamber 149. This deflection of the diaphragm 82, and consequently of the diaphragm 81, effects a displacement of liquid in chambers 83 and 89, causing the plunger 90 to move upwardly relative to the button 95, thus compressing the control spring 93, the increase in pressure in which stops said deflection before the follower plate 96 engages and unseats the brake release valve 103. The brake valve device thus automatically moves to what may be called a lap position, in which the liquid under pressure is bottled in the brake cylinder chamber 149 when the pressure of liquid obtained in said chamber is increased to a degree substantially in proportion to the pressure of the control spring 93.

In effecting an application of the brakes, the pressure of the liquid in chamber 133 in the brake valve device increases as the pressure increases in chamber 84 and in the brake cylinder chamber 149, since chamber 133 is at all times in direct communication with chamber 84 through passages 134 and 102. When the brake cylinder pressure has been increased to a predetermined degree, such as will ensure stopping of the car, the substantially corresponding pressure acting in chamber 133 on the valve 136 in the brake valve device, overcomes the opposing predetermined pressure of the spring 139 and unseats the valve 136, which admits liquid under pressure to chamber 137 and from thence through passage 138 to chamber 130. The consequent increase in pressure in chamber 130 deflects the diaphragm 127 upwardly to seat the valve 140 and unseat the valve 142, which admits liquid under pressure from chamber 143 to chamber 141 and from thence through passage and pipe 169 to the seat of the rotary valve 78 in the operator's door valve 4, it being understood, as hereinbefore described, that said chamber 143 is supplied with liquid under pressure from the supply pipe 108 through pipe 109, passage 110 in the brake valve device, valve chamber 107 and from thence through passage 164.

After having effected a predetermined application of the brakes and thus obtaining liquid under pressure in pipe 169 leading to the operator's door valve device 4, if the operator desires to open the car door (not shown) at the operating end of the car, to take on or leave off passengers, he turns the handle 80 of the door valve device 4 from the door closed position as shown in Fig. 1 to the door open position shown in Fig. 8.

In the door open position of the door valve device 4, the door closing piston chamber 163 in the door engine 3 at the operating end of the car is opened to the sump reservoir 6 through pipe 162, cavity 174 in the rotary valve 78 and pipes 87 and 88, thus relieving the pressure on the door closing piston 65. At the same time, liquid under pressure is supplied from pipe 169 to the door opening piston chamber 172 through cavity 170 in the door valve rotary valve 78, and from cavity 170 through pipe 171.

The pressure thus applied to the door opening piston 66 operates said piston to move the door engine parts toward the left hand and such movement may be limited by stops (not shown) engageable by the car doors (not shown) in the door open position or in any other suitable manner such as will stop the movement of the door closing piston 65 and rack 63 in a position in which the piston 65 will just clear the casing. Just before the movement of the door closing piston 65 and rack 63 is stopped, said piston engages the movable member 154 so that the remainder of the movement of said piston and rack is resiliently opposed by the pressure of the spring 73. After the rack 63 is stopped in the door open position, the door opening piston 66 continues to move relative to said rack, due to the telescoping of the stem 67 within the rack, until the gasket 71 on the back of said piston engages the seat rib 72 in the casing. The leakproof seal thus obtained between the gasket 71 and the seat rib 72 is provided to reduce to a minimum the possibility of leakage of fluid under pressure from the pressure chamber 172 to the chamber intermediate the pistons 65 and 66.

As the door engine parts move in a left hand direction from the door closed to the door open position, the switch arm 155, being movable with the rack 63, breaks the circuit through the contact 74 from the wire 22 to the wire 75. The wire 22 being connected through the contact member 18 on the shaft 15 of the emergency valve device to the supply wire 21 and the wire 75 being connected to the magnet 53 of the circuit breaker device 9 through the contact 74 on the switch arm 155 associated with the door engine 3 at the non-operating end of the car, and the wire 59, the breaking of the circuit breaker control circuit through the contact 74 at the operating end of the car results in the de-energization of said magnet. The switch member 54 will then be operated to open the motive power circuit by breaking the connection from the wire 55, which is connected by the wire 56 to the supply wire 21, to the wire 57. Thus, the operation of the door engine and the circuit breaker are interlocked in such a way that whereas when the door engine is in the door closed position the circuit breaker closes the motive power circuit to the controller, when the door engine moves toward the door open position the circuit breaker operates to open the motive power circuit to the controller.

When the operator desires to operate the door engine 3 to close the car door, he turns the door valve device 4 from the door opening position shown in Fig. 8 to the door closing position shown in Fig. 1. In the door closing position, the door opening piston chamber 172 is opened to the sump reservoir 6 through pipe 171, cavity 173 in the rotary valve 78 of the door valve device 4 and pipes 87 and 88, so that the pressure acting on the liquid in said chamber 172 is relieved. At the same time, liquid under pressure is supplied from the supply pipe 108 through the rotary valve chamber 77 in the door valve device 4, port 161 in the rotary valve 78 and pipe 162 to the door closing piston chamber 163, so that the door closing piston 65 is operated to move the door engine parts to the door closing position, the spring 73 in the door opening end of the engine serving to cushion the stopping of the parts in the door closed position, and the piston 66 moves into sealing engagement with the seat rib 72, in the same manner as when the door engine is operated to open the car door (not shown).

When the door engine parts are in the door closed position, the contact 74 on the switch arm 155 again completes the circuit breaker control circuit from the wire 22 to the wire 75 so that the magnet 53 of the circuit breaker device 9 will again be energized and the switch member 54 will be operated to connect the wires 55 and 57, thereby closing the motive power circuit to the controller.

In order to release the brakes after an application, the operator relieves pressure from the button 95, which permits the control spring 93 to expand to its normal condition and relieve pressure on the plunger 90. The liquid at brake cylinder pressure acting in chamber 84 on the diaphragm 82 then deflects said diaphragm and diaphragm 81 upwardly to their normal positions, and in so doing, the follower plate 96 engages and unseats the brake release valve 103.

The unseating of the brake release valve 103 opens the brake cylinder pressure chamber 149 to the sump reservoir 6 by way of pipe 49, passage 168 in the emergency valve device, cavity 167 in the rotary valve 14, passage 166, pipe 165, chamber 133, passages 134 and 102 in the brake valve device, chamber 101, past the release valve 103 to the sump chamber 85 and from thence through pipes 86, 87 and 88 to the sump reservoir 6. The pressure in the brake cylinder chamber 149 and in chamber 84 in the brake valve device being thus completely reduced permits a release of the brakes.

In releasing the brakes, the pressure of the liquid in chamber 130 reduces with the reduction in brake cylinder pressure on account of the communication through passage 131, past the check valve 132 and through chamber 133 and passage 134 to passage 102, through which passage 102 the brake cylinder pressure is reduced. When the pressure in chamber 130 is thus reduced to below the opposing pressure of the spring 147, said spring deflects the diaphragm 127 downwardly to its normal position, which permits the spring 144 to seat the valve 142 and to unseat the valve 140. The seating of the valve 142 closes communication from the pressure supply chamber 143 to chamber 141, while the unseating of the valve 140 opens chamber 141, and consequently pipe 169 leading to the door valve device 4, to chamber 128 and from thence through passage 129 to the sump chamber 85, which is at all times open to the sump reservoir 6. By thus opening the pipe 169 to the sump reservoir 6, in releasing the brakes, the supply of liquid under pressure for operating the door engine 3 to open the car door is cut off, so that said door cannot be opened, as hereinbefore described, by the operation of the door valve device 6.

If, while the brakes are released, the operator should relieve the heel plate 126 of heel pressure, as for instance due to his becoming incapacitated, the spring 118 in the brake valve device on the non-operating end of the car will act on the lever 17 of the emergency valve device through the plunger 116, the bell-crank lever arms 120 and 121, and the cable 122 to turn said lever, and consequently the rotary valve 14 in a clockwise direction until stopped by the opposing pressure of the spring 118 in the brake valve device at the operating end of the car acting on the lever 17 through the medium of the plunger 116, the bell-crank lever arms 120 and 121, and the cable 122. The rotation of the lever 17 and the rotary valve 14 will be stopped in the emergency position, as shown in Fig. 5.

In the emergency position of the rotary valve 14, liquid under pressure flows from the pressure reservoir 7 to the brake cylinder pressure chamber 149 through pipe and passage 13, cavity 175 in said rotary valve, passage 168 and pipe 49. Furthermore, since in the emergency position of the emergency valve device 6, the pressure supply pipe 108 is opened to the sump reservoir 6 through passage 160 in the emergency valve device, cavity 176 in the rotary valve 14, passage 177, and pipes 178 and 88, liquid under pressure is released from the door closing piston chamber 163 of the door engine 3 through pipe 162, port 161 in the rotary valve 78 of the door valve device 4, chamber 77 and from thence through the supply pipe 108, and since the door opening piston chamber 172 is normally open to the sump reservoir 6 through pipe 171, cavity 173 in the rotary valve 78, and pipes 87 and 88, the opposing pressures acting on the door engine pistons 65 and 66 are equalized, so that said door engine will not oppose opening of the car door by hand in the usual manner.

The turning of the shaft 15 of the emergency valve device 1 to the emergency position causes the contact member 18 to engage a contact connected to the supply wire 21 and the contact member 19 to engage a contact connected to the wire 22, as shown in Fig. 6, and since said contact members are insulated from each other, the control circuit to the circuit breaker magnet 53 is opened. The resulting deenergization of said magnet permits the switch member 54 to be operated so as to open the motive power circuit to the controller by disconnecting the wire 55 from the wire 57.

It should be noted that if the brakes should fail to apply, for any reason, the car motors may be reversed for stopping the car. As explained above, when the emergency valve moves to emergency position, the circuit breaker magnet 53 is deenergized, permitting the switch member 54 to be operated so as to open the motive power circuit to the controller. In the event of the brakes failing to apply, the operator may move the controller reverser contact 62 to the reverse position in which the wire 56, which is connected to the supply wire 21, is connected through said contact to the wire 61, which is connected by the wire 60 to the wire 59 leading to the circuit breaker magnet 53. The flow of trolley current to the magnet 53 again energizes said magnet, and the switch member 54 will be operated so as to close the motive power circuit to the controller, which may then be operated in the usual manner to supply current to the car motors. The controller reverser being in the reverse position, current supplied through the controller to the car motors will tend to reverse their direction of rotation, and the retarding force thus developed will stop the car.

In the emergency position of the emergency valve device, the contact member 20 carried by the emergency valve shaft 15 bridges the contact connected to the wire 23 and the contact connected to the wire 24 which leads to a contact controlled by the switch member 52 of the switch device 11. Said switch member is initially in the circuit closing position, as shown in Fig. 1, being held there by the pressure of the spring 51 acting on said switch member against the opposing pressure of the liquid under pressure in the piston chamber 47 acting on the piston 48, which chamber, being connected to the brake cylinder pipe 49 through the pipe 50, always contains liquid at brake cylinder pressure. With the switch member 52 in the circuit closing position, the contact connected to the wire 24 is connected by said switch member to the contact connected to the wire 29 leading to the operating coil 26 of the sanding magnet device 10. Thus, the "energizing" circuit is closed from the supply wire 21 to the operating coil 26 through the wire 23, contact member 20, wire 24, the switch member 52, and the wire 29. The resulting energization of said operating coil causes the plunger 27 to be shifted downwardly, thereby causing the bell-crank lever arms 39 and 42 to be rotated in a clockwise direction. This movement of the lever arm 42 will operate, through the medium of the rod 43, to move the door 36 in the sand trap 33 in a left hand direction against the opposing pressure of the spring 38, until the opening 37 in said door opens the outlet passageway 35 from the sand chamber 34, which permits sand to be discharged from said chamber onto the car rails. It will be noted that the lost motion provided between the pin 46, carried by the lever arm 39, and the rod 44 within the slot 45 permits the bell-crank lever arms to rotate relative to the rod 44. The downward movement of the plunger 27 also causes the switch member 28 to bridge the contact connected to the wire 31 and the contact connected by the wire 32 to the wire 29 leading to the operating coil 26, for a purpose which will now appear.

It will be noted that the wire 24 is continuously connected to the wire 25 which, when the door engine 3 at the non-operating end of the car is in the door closed position, is connected by the contact 76 carried by the switch arm 155 associated with said door engine, to the wire 156 which, in turn, is connected by the contact 76 carried by the switch arm 155 associated with the door engine 3 at the operating end of the car to the wire 31 when said last mentioned door engine is in the door closed position. Thus, the switch member 28 being in the circuit closing position, as above described, a "holding" circuit to the operating coil 26 is completed, independently of the "energizing" circuit to said coil, which "energizing" circuit is closed through the switch member 52 of the switch device 11, as above described. Therefore, when the pressure of the liquid in the piston chamber 47 acting on the piston 48 against the opposing pressure of the spring 51, which corresponds with the pressure of the liquid in the brake cylinder pressure chamber 149, increases to a predetermined amount, said piston, and therefore the switch member 52, will be moved upwardly, causing the "energizing" circuit to the operating coil 26 to be broken. The "holding" circuit, however, being closed, as above described, the operating coil 26 will remain energized and the door 36 controlling the outlet pasageway 35 from the sand chamber 34 will remain open, as long as both door engines remain in the door closed position. If, however, either door engine is moved to the door open position, then the "holding" circuit will be opened at the respective contact 76, with the result that the operating coil 26 will become deenergized.

With said coil deenergized, the spring 38 will pull the sand trap door 36 to the closed position and this movement of the door will act, through the medium of the rod 43, to rotate the bell-crank lever arms 39 and 42 in a counter-clockwise direction to the position shown in Fig. 7, causing the plunger 27, and with it the switch member 28, to be shifted upwardly. The upward movement of said switch member breaks the connection from the wire 31 to the wire 32. Now, if the door engine should be moved to the door closed position again, while the brakes remain applied, the sanding magnet operating coil 26 will not again be energized because, the switch member 52 being in the circuit opening position, the "energizing" circuit to said operating coil is open and the switch member 28 will therefore remain in the circuit opening position, as hereinbefore described, and therefore sand will not again be applied to the car rails upon the closing of the car door while the brakes remain applied.

The sand trap door 36 may be manually operated by the operator by applying an upward pull to the rod 44. When said rod is pulled upwardly, the bell-crank lever arms 39 and 42 are rotated in a clockwise direction so that the door 36 may be pulled in a left hand direction until the opening 37 therein opens the outlet passageway 35, as above described. Upon the relief of pull from the rod 44, the spring 38 will act to close the door 36 and to rotate the bell-crank lever arms 39 and 42 to the position shown in Fig. 7.

As hereinbefore explained, when the pressure of the liquid in the piston chamber 47 of the switch device 11, and consequently in the brake cylinder pressure chamber 149, has increased to a predetermined degree, the piston 48 is moved outwardly against the opposing pressure of the spring 51, thereby causing the switch member 52 to open the "energizing" circuit to the operating coil 26 of the sanding magnet device 10. Thus, when the pressure of the liquid in the brake cylinder has been built up to a predetermined degree, the operator may relieve the pressure of his heel from the heel plate 126 and thus permit the emergency valve device 1 to be moved to the emergency position without causing sand to be applied to the rails.

In order to effect a release of the brakes and operate both door engines to close their respective doors after an emergency application of the brakes, the operator depresses the heel plate 126 and thereby pulls the emergency valve device to its normal position, and with no pressure applied to the push button 95, the brake cylinder pressure chamber 149 and the door opening piston chamber 172 of the door engines 3 are connected to the sump reservoir 6, and liquid under pressure is supplied to the door closing piston chambers 163 of said engines, so that the car doors will be closed, in the same manner as hereinbefore described.

If the operator desires to change operating ends, he depresses the button 95 on the brake valve device 2 at the left hand end, or the operating end, of the car, while holding the heel plate 126 depressed, and thus effects an application of the brakes in the manner hereinbefore described. When the pressure of the liquid in the brake cylinder pressure chamber 149 has increased to a predetermined degree, the switch member 52 of the switch device 11 will be operated to break the connection from the wire 24 to the wire 29 leading to the operating coil 26 of the sanding magnet device 10. Then the operator, while holding the button 95 depressed, relieves the heel plate 126 of heel pressure, which permits the emergency valve device 1 to be moved to the emergency position. In this position of the emergency valve device, the brakes are held applied and the switch member 52 is held in the circuit opening position. It will be evident from the foregoing that the object in first applying the brakes by depressing the button 95 is to effect the operation of the switch device 11 so that when the emergency valve device subsequently moves to the emergency position, as above mentioned, and causes the contact member 20 carried on shaft 15 of said emergency valve device to connect the wires 23 and 24, the connection from the wire 24 to the wire 29 leading to the operating coil 26 of the sanding magnet device 10 will be broken by the switch member 52. Thus, the sanding magnet device remains de-energized, which permits the operator to change operating ends without causing sand to be applied to the rails.

The operator having relieved the heel plate 126 of heel pressure, he pulls the push rod 125 out of the brake valve device by means of said heel plate. He also removes the door valve operating handle 80 from the door valve device 4 in the door closed position of said device and applies said handle and the push rod 125 and heel plate 126 to the door valve device 4 and the brake valve device 1, respectively, at the opposite end of the car, which in the present case will be the right hand end of the equipment, as viewed in Fig. 1—A of the drawings. Then, to operate the car, he depresses the heel plate 126 to its normal operating position and in so doing pulls the emergency valve operating lever 17 and rotary valve 14 to the operating position shown in Figs. 3 and 4.

With the rotary valve 14 in the position shown in Fig. 3, liquid under pressure is supplied from the rotary valve chamber 12 to the pressure supply pipe 108 through a port 178 in said rotary valve and passage 160, and the brake cylinder pressure chamber 149 is connected to the brake valve device 2 at the operating end of the car through pipe 49, passage 168, cavity 179 in the rotary valve 14, passage 180, and pipe 165. With the communication just described established, the operation of the car brakes and doors is the same as when the operating end of the car was at the opposite end of the car, as has been hereinbefore fully described.

With the heel plate 126 applied to the brake valve device 2 at the right hand end of the car, as viewed in Fig. 1—A of the drawings, and depressed, the contact 19 bridges the contacts connected to the wires 21 and 22, so as to close the control circuit to the circuit breaker magnet 53 which is energized so as to close the motive power circuit to the controller.

It will thus be seen that I have provided means whereby, when an emergency application of the brakes is effected, the power circuit to the controller will be opened, but should the brakes fail to apply, for any reason, the power circuit may be closed again by moving the controller reverser to the reverse position, after which current may be supplied to the car motors through the controller, in the usual manner, to reverse the motors and thereby stop the car. It will further be noted that I have provided means whereby, when an emergency application of the brakes is effected, sand will be automatically applied to the rails until a car door is opened, but sand will not be aplied upon closing said door.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. In a fluid pressure brake, the combination with a valve device having a normal position and movable to an application position for effecting an application of the brakes on a car, of an electrically controlled circuit breaker device operative upon energization to close the motive power circuit on said car, means for controlling the opening and closing of a door of the car, a motive power controller having a reverser, and means controlled by said valve device and by the first mentioned means for controlling the circuit through said circuit breaker device and operative to open said circuit upon the movement of said valve device to application position or upon the operation of the first mentioned means to open said car door, said reverser being operative to close the circuit through said circuit breaker device independently of the second mentioned means.

2. In a fluid pressure brake, the combination with valve means having a normal position and movable to an application position for effecting an application of the brakes on a car, of an electrically controlled circuit breaker device operative upon energization to close the motive power circuit on said car, a door engine for opening and closing a door of the car, a motive power controller having a reverser, means controlled by said valve means and door engine for controlling the circuit through said circuit breaker device and operative to open said circuit upon the movement of said valve means to application position or upon the operation of said door engine to open said car door, said reverser being operative to close the circuit through said circuit breaker independently of the second mentioned means.

3. In a fluid pressure brake, the combination with a brake cylinder, and a valve device having a normal position and movable to an application position for effecting an application of the brakes on a car, of electro-responsive means operative upon energization to supply sand, switch means operative upon energization of said electro-responsive means to close a circuit to said electro-responsive means, other switch means for controlling another circuit to said electro-responsive means independently of the first mentioned switch means and operative upon a predetermined increase in pressure in the brake cylinder to open the last mentioned circuit, means for controlling the opening and closing of a door of the car, means operative to open the first mentioned circuit upon the operation of the last mentioned means to open said car door, and means controlled by said valve device for controlling the circuits to both of said switch means and operative to close said circuits upon movement of said valve device to application position.

4. In a fluid pressure brake, the combination with a brake cylinder, and a valve device having a normal position and movable to an application position for effecting an application of the brakes on a car, of electro-responsive means operative upon energization to supply sand, switch means operative upon energization of said electro-responsive means to close a circuit to said electro-responsive means, other switch means in a circuit shunting the first mentioned switch means and operative to open said shunt circuit upon a predetermined increase in pressure in the brake cylinder, a door engine for controlling the opening and closing of the door of a car, a switch device controlled by said door engine for controlling the circuit to the first mentioned switch means and operative to open said circuit upon the operation of said door engine to open the car door, and means controlled by said valve device for controlling the circuits to both of said switch means and operative to close said circuits upon movement of said valve device to application position.

5. In a fluid pressure brake, the combination with a brake cylinder, and valve means having a normal position and movable to an application position for effecting an application of the brakes on a car, of a sand trap having an outlet passageway, a door for opening and closing said passageway, a magnet device comprising an operating coil, a plunger controlled by said coil and operatively connected to said door, and also comprising a switch member mounted on said plunger and adapted to close a circuit to said operating coil, said coil being adapted upon energization to operate said plunger so as to open said door and to move said switch member to the circuit closing position, switch means in a circuit shunting said switch member and operative to open said shunt circuit upon a predetermined increase in pressure in the brake cylinder, a door engine for opening and closing a door of the car, a switch device controlled by said door engine for controlling the circuit to said switch member and operative to open said circuit upon the operation of said door engine to open the car door, and a switch device controlled by said valve means and operative to close the circuits to said switch member and to said switch means upon movement of said valve device to application position.

6. In a fluid pressure brake, the combination with a brake cylinder, and valve means having a normal position and movable to an application position for effecting an application of the brakes on a car, of a magnet operative upon energization to supply sand, switch means operative upon energization of said magnet to close a circuit to said magnet, a door engine for opening and closing a door of the car, a switch device controlled by said door engine and connected in series with said switch means and operative to open the circuit to said switch means upon the operation of said door engine to open the car door, a switch device connected in parallel with said last mentioned switch device and with said switch means and operative to open another circuit to said magnet upon a predetermined increase in pressure in the brake cylinder, and a switch device controlled by said valve means and operative to close the circuit to said switch devices upon movement of said valve means to application position.

7. In a fluid pressure brake, the combination with a brake cylinder, and valve means having a normal position and movable to an application position for effecting an application of the brakes on a car, of a magnet operative upon energization to supply sand, switch means operative upon energization of said magnet to close a circuit to said magnet, a door engine for opening and closing a door of the car, another door engine for opening and closing a door of the car, a switch device controlled by the first mentioned door engine and connected in series with said switch means and operative to open the circuit to said switch means upon the operation of said door engine to open the car door, a switch device controlled by the second mentioned door engine and connected in series with the first mentioned switch device and operative to open the circuit to said switch means upon the operation of said last mentioned door engine to open the car door, a switch device connected in a circuit shunting said switch means and operative to open said shunt circuit upon a predetermined increase in pressure in the brake cylinder, and a switch device controlled by said valve means and operative to close the circuit to said switch devices upon movement of said valve means to application position.

8. In a fluid pressure brake, the combination with a brake cylinder, and valve means normally subject to manual pressure and operative upon the relief of said manual pressure to effect an application of the brakes on a car, of a sand trap having a sand outlet passageway, a door for opening and closing said passageway, a magnet for controlling the operation of said door and operative upon energization to open said door, switch means controlled by said magnet for controlling a circuit to said magnet and operative upon the energization thereof for closing said circuit, a door engine for opening and closing the door of a car, means controlled by said door engine for controlling the circuit to said switch means and operative to open said circuit upon the operation of said door engine to open the car door, switch means in a circuit shunting the first mentioned switch means and operative to open said shunt circuit upon a predetermined increase in pressure in the brake cylinder, and means controlled by said valve means for controlling the circuits to both of said switch means and operative to close said circuits upon the relief of said manual pressure.

JOSEPH C. McCUNE.